United States Patent
Moriwaki

(10) Patent No.: US 7,684,071 B2
(45) Date of Patent: Mar. 23, 2010

(54) DATA COMMUNICATION DEVICE, COMPUTER READABLE MEDIUM AND METHOD FOR TRANSMITTING AND MANAGING DATA

(75) Inventor: Kagumi Moriwaki, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1665 days.

(21) Appl. No.: 10/811,996

(22) Filed: Mar. 30, 2004

(65) Prior Publication Data

US 2004/0246523 A1   Dec. 9, 2004

(30) Foreign Application Priority Data

Jun. 9, 2003  (JP) ............................. 2003-163577
Jan. 23, 2004  (JP) ............................. 2004-016376

(51) Int. Cl.
*G06F 15/00* (2006.01)
*G06F 15/16* (2006.01)

(52) U.S. Cl. ..................................... 358/1.15; 709/206

(58) Field of Classification Search ................ 358/1.15, 358/1.16, 402, 405, 407; 709/206, 202, 226, 709/204, 217, 218, 207, 231; 713/153, 183, 713/172, 156, 171, 184, 165, 193; 705/1, 705/2, 5, 15, 26, 75, 78; 379/88.17
See application file for complete search history.

(56) References Cited

U.S. PATENT DOCUMENTS 6,700,591 B1 * 3/2004 Sharpe ........................ 715/762
7,444,382 B2 * 10/2008 Malik ........................ 709/206
2002/0004899 A1 * 1/2002 Azuma ....................... 713/152
2003/0195935 A1 * 10/2003 Leeper ....................... 709/206

FOREIGN PATENT DOCUMENTS

| JP | 7093229 | 4/1995 |
| JP | 8323951 | 12/1996 |
| JP | 10-032653 | 2/1998 |
| JP | 2002 354271 | 12/2002 |
| JP | 2002-359645 | 12/2002 |
| JP | 2003085069 | 3/2003 |

OTHER PUBLICATIONS

Examiner's Answer issued Feb. 21, 2008 and received Mar. 4, 2008 in Japanese Patent Application No. 2004-016376 and English translation thereof.

* cited by examiner

*Primary Examiner*—Saeid Ebrahimi Dehkordy
(74) *Attorney, Agent, or Firm*—Buchanan Ingersoll & Rooney PC

(57) ABSTRACT

A data communication device capable of facilitating file management compared to conventional methods is provided. The data communication device includes an image file storage portion for memorizing an image file to be sent to a user at the other end, a transmission information setting portion for setting transmission information necessary for sending the image file to the user at the other end, a file combining portion for generating a composite file by adding the transmission information to the image file and an e-mail message transmission portion for sending the generated composite file to the user at the other end.

2 Claims, 17 Drawing Sheets

FIG. 4

| ITEM | CONTENTS |
|---|---|
| Date: | 2003/3/20 |
| From: | SATO (sato@···) |
| To: | TANAKA (tanaka@···) |
| Cc: | SUZUKI (suzuki@···) |
| Bcc: | ? ? ? ? ? ? (ENCRYPTED DATA) |
| Title: | ESTIMATE |
| Body | Thank you for your inquiry. Attached hereto is an estimate of XXX. We appreciate your consideration. |

81 — SDT

Date: 2003/3/20
To: TANAKA (tanaka@···)
Cc: SUZUKI (suzuki@···)
Bcc: YAMADA (yamada@···)

FROM: SATO (sato@···)

THE FIRST PAGE
  THE SECOND PAGE

FIG. 9

| | |
|---|---|
| FILE SEARCH | |
| SENDER (from): | SATO |
| RECIPIENT (to): | |
| RECIPIENT (cc): | |
| RECIPIENT (bcc): | |
| SUBJECT (title): | |
| BODY (body): | |
| DATE (date): | 2003/01/01-2003/04/30 |
| SEARCH | CANCEL |

| | COLOR | SIZE | POSITION | BOLD-FACE | UNDER-SCORE |
|---|---|---|---|---|---|
| SENDER (from): | BLACK ▼ | 12p | (x1,y1) | ☒ | ☐ |
| RECIPIENT (to): | TRANSPARENT ▼ | 12p | (x2,y2) | ☐ | ☐ |
| RECIPIENT (cc): | TRANSPARENT ▼ | 12p | (x3,y3) | ☐ | ☐ |
| RECIPIENT (bcc): | TRANSPARENT ▼ | 12p | (x8,y8) | ☐ | ☐ |
| SUBJECT (title): | RED ▼ | 16p | (x4,y4) | ☒ | ☒ |
| BODY (body): | BLUE ▼ | 10p | (x7,y7) | ☐ | ☐ |
| DATE (date): | GREEN ▼ | 12p | (x6,y6) | ☐ | ☒ |

DISPLAY SETTING

DISPLAY TYPE OF TRANSMISSION INFORMATION
- ⦿ OVERLAID ON THE FIRST PAGE FOR DISPLAY
- ○ ADDED AS A FRONT PAGE FOR DISPLAY

[SET]  [CANCEL]

HG5

F2

DATA COMMUNICATION DEVICE, COMPUTER READABLE MEDIUM AND METHOD FOR TRANSMITTING AND MANAGING DATA

This application is based on Japanese Patent Applications No. 2003-163577 filed on Jun. 9, 2003 and No. 2004-016376 filed on Jan. 23, 2004, the contents of which are hereby incorporated by reference.

BACKGROUND OF THE INVENTION

1. Field of the Invention

The present invention relates to a data communication device for file transmission or file reception and a computer readable medium.

2. Description of the Related Art

Conventionally, there are proposed methods for transmitting image data that are obtained by scanning a document or in other ways to a device at the other end (at the receiving end) and methods for managing the data. According to a method described in Japanese unexamined patent publication No. 10-32653, for example, a facsimile machine is used to send image data to a device at the receiving end. The device stores the received image data in the form of a file in a memory portion for management.

According to a method described in Japanese unexamined patent publication No. 2002-359645, a device at the sending end transmits facsimile data to a device at the receiving end in the form of an e-mail attachment. On this occasion, the device at the sending end adds a keyword to a header of an e-mail message. The device at the receiving end manages the attachment along with the e-mail message.

In this way, a device at the receiving end electronically memorizes received data as a file instead of outputting the received data to paper, allowing for easy management of the received data.

Data attached to an e-mail message (an attachment) are usually used after being transferred to a directory other than a directory of an in-box in e-mail software (a directory or a recording medium for a user's work, for example) or after being copied.

As the number of files memorized by a device at the receiving end increases, it becomes difficult for a user to find a desired file. Then, for example, the method mentioned above is conceivable in which a received file is associated with a keyword added to an e-mail message for management (Japanese unexamined patent publication No. 2002-359645). Thereby, a desired file can be searched with reference to the keyword.

According to the method, however, it is required to use e-mail software in order to search a file in reference to a keyword. This is because the keyword is added to a header of an e-mail message. When a user is interested in an attribute including a transmission source of a file, it is also required to use e-mail software for similar reasons.

Accordingly, when a file is transferred to a directory different from a directory of an in-box in e-mail software or others, association between the file and the e-mail message is lost. Thus, it becomes impossible to search the file with reference to a keyword and to know an attribute such as a transmission source of the file, making file management difficult.

SUMMARY OF THE INVENTION

The present invention is directed to solve the problems pointed out above, and therefore, an object of the present invention is to facilitate file management for a user who receives a file compared to conventional methods.

According to one aspect of the present invention, a data communication device includes a file memory portion for memorizing a first file to be sent to a user at the other end, a transmission information setting portion for setting transmission information necessary for sending the first file to the user at the other end, a file generation portion for generating a second file by adding the transmission information to the first file, and a transmission portion for sending the generated second file to the user at the other end.

In a preferred embodiment, the data communication device further includes an encryption portion for encrypting contents of a predetermined item of the transmission information. The file generation portion generates the second file by adding the transmission information where the contents of the predetermined item are encrypted to the first file.

Further, the data communication device includes a designation acceptance portion for accepting a designation whether or not the encrypted contents of the transmission information of the first file are allowed to be disclosed to the user at the other end from a sender of the first file, and a decryption information transmission portion for sending decryption information for decrypting the encrypted contents to the user at the other end when a designation is accepted in which the encrypted contents are allowed to be disclosed to the user at the other end.

According to another aspect of the present invention, a data communication device includes a file generation portion for generating a second file by adding transmission information that is set by a user at the other end in order to send a first file to the first file sent from the user at the other end, and a file storage portion for storing the generated second file in a storage medium.

Each of the data communication devices mentioned above can be structured as follows.

The data communication device further includes a display setting portion for setting whether or not the transmission information is displayed. The file generation portion generates the second file by setting a font used for displaying the transmission information to transparent when the display setting portion sets that the transmission information is not displayed.

Further, the transmission information includes plural items, the display setting portion sets whether or not contents of the items of the transmission information are displayed for each of the items, and the file generation portion generates the second file by adding contents of an item that is set to be displayed to the first file as a text object using a chromatic font, and generates the second file by adding contents of an item that is set to be not displayed to the first file as a text object using a transparent font, both the items being a part of the items of the transmission information.

Furthermore, the data communication device further includes a display setting portion for setting whether or not the transmission information and contents of the first file are displayed on a common page. The first file is a file of a document including one or more pages, and the file generation portion generates the second file by inserting a text object indicative of contents of the transmission information into a first page of the first file when the transmission information and the contents of the first file are set to be displayed on the common page, and generates the second file by adding a new page to insert the text object indicative of the contents of the transmission information into the new page when the transmission information and the contents of the first file are set to be not displayed on the common page.

The present invention facilitates file management for a user who receives a file compared to conventional methods. Additionally, transmission information can be protected more properly and leakage of confidential information can be prevented.

These and other characteristics and objects of the present invention will become more apparent by the following descriptions of preferred embodiments with reference to drawings.

BRIEF DESCRIPTION OF THE DRAWINGS

FIG. 4 is a table showing an example of set contents of transmission information.

FIG. 9 shows an example of a file search screen.

FIG. 16 shows an example of a display setting screen.

DESCRIPTION OF THE PREFERRED EMBODIMENTS

First Embodiment

Figure 1:
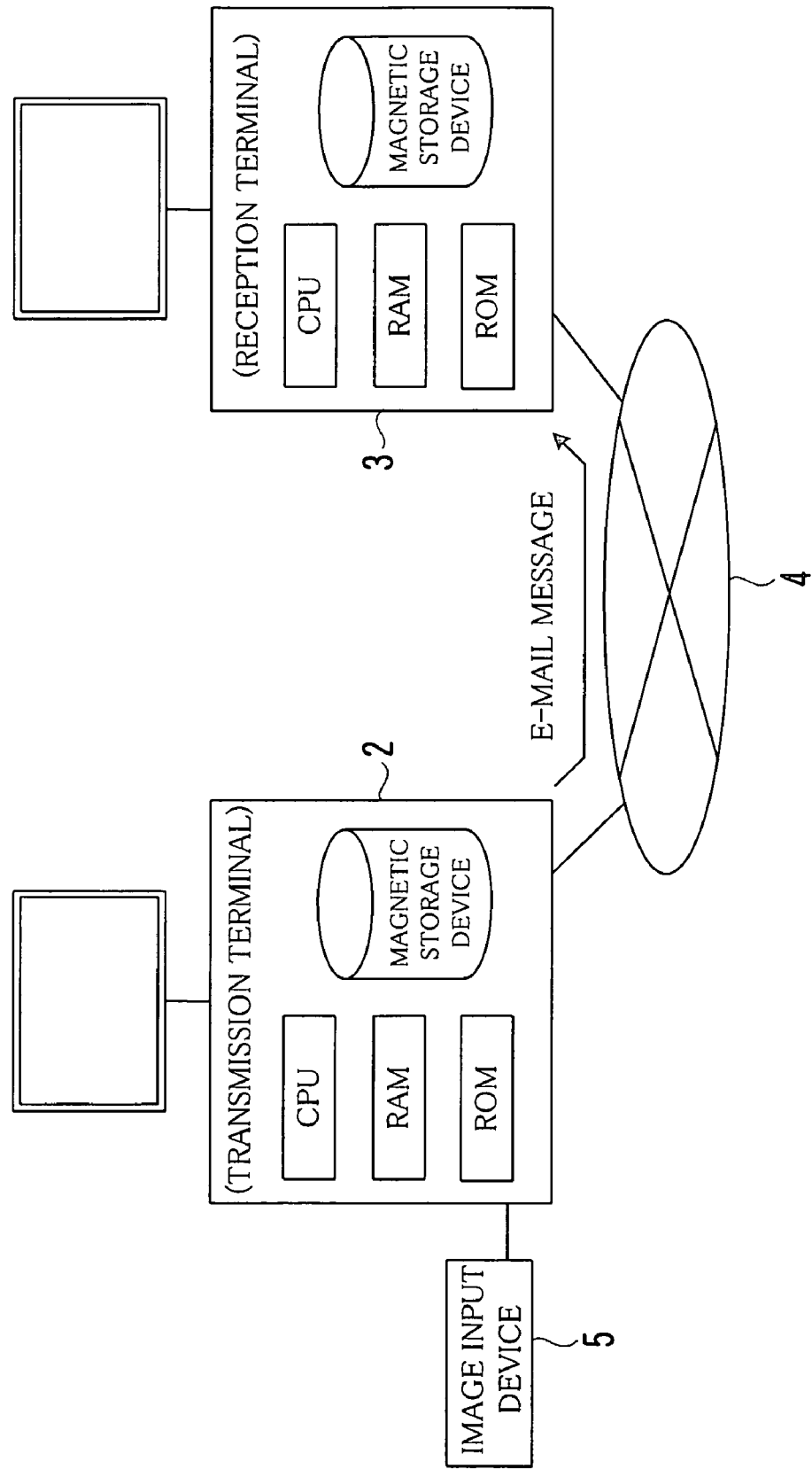
FIG. 1 is a diagram showing an example of a general structure of an e-mail transmission and reception system.
Figure 2:
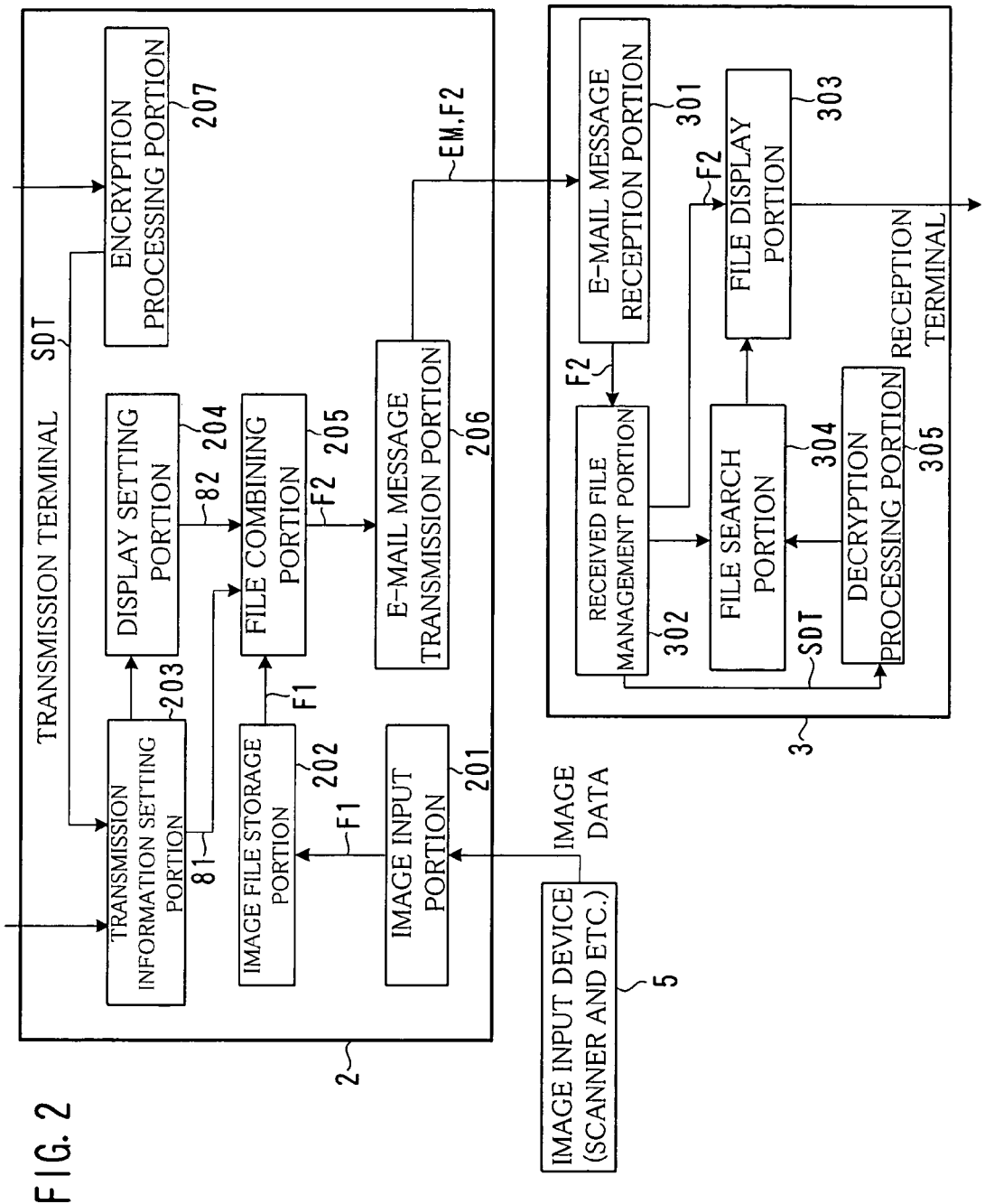
FIG. 2 is a diagram showing an example of a functional structure of a transmission terminal and a reception terminal.
Figure 3:
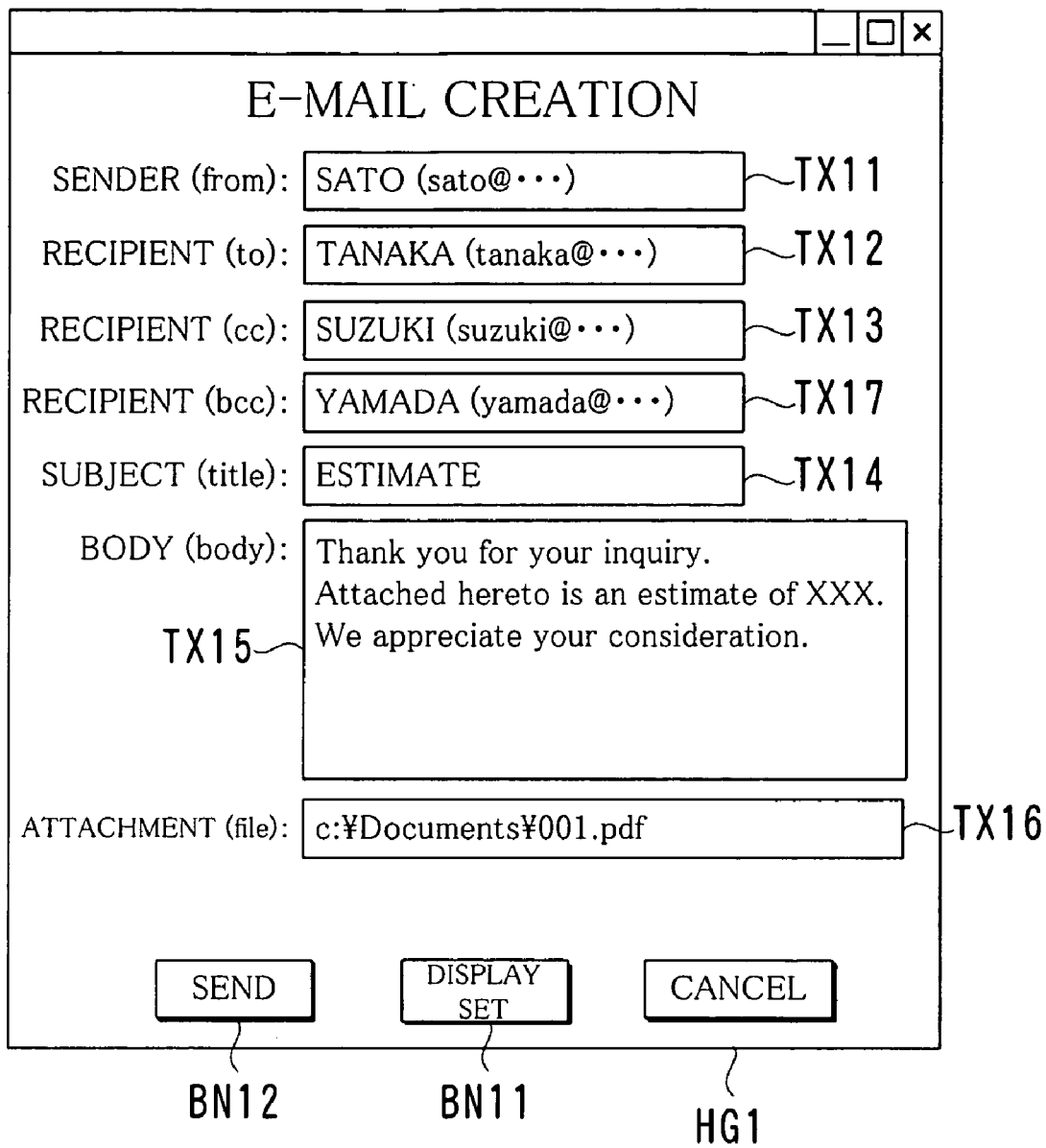
FIG. 3 shows an example of an e-mail creation screen.
Figure 5:
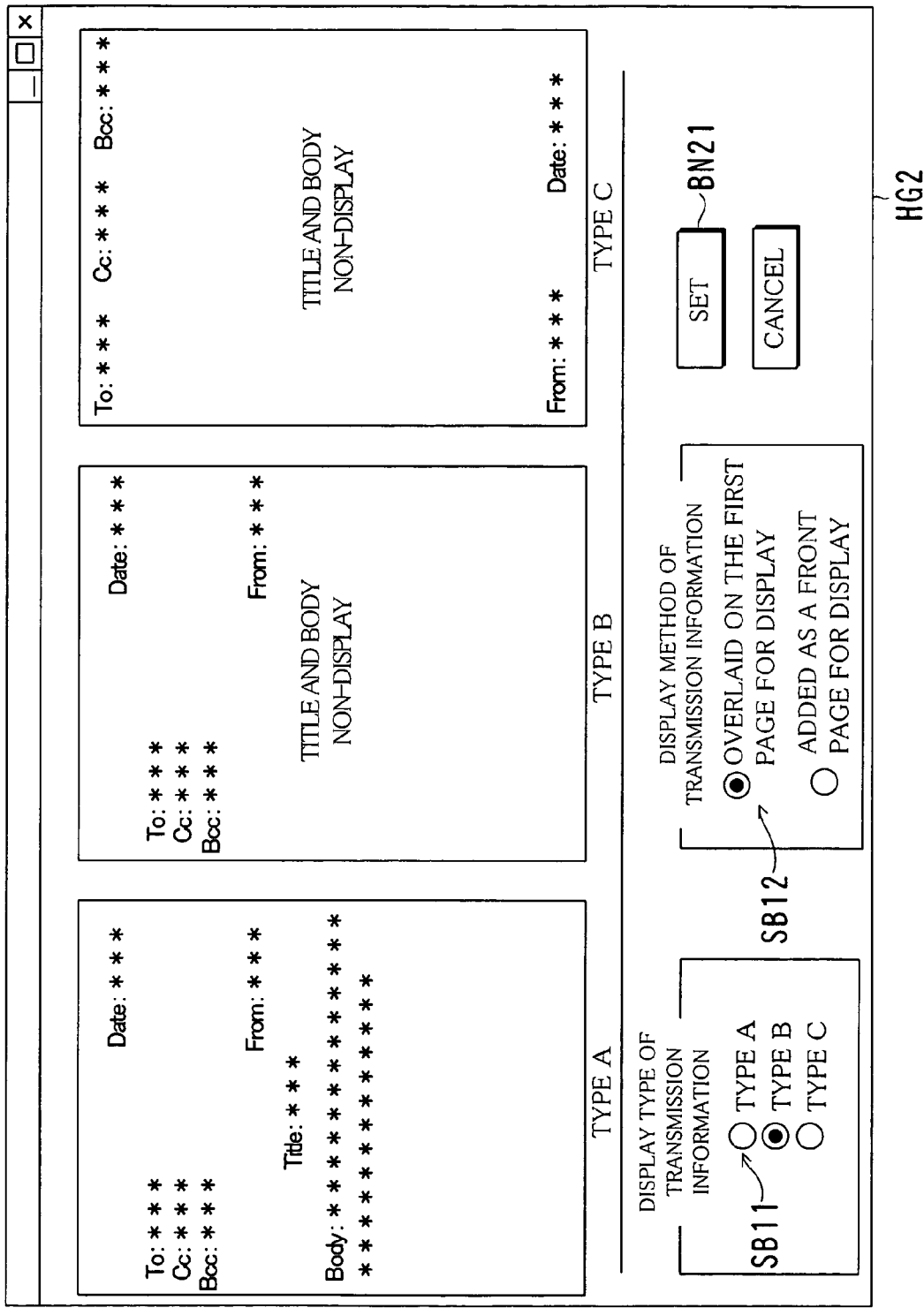
FIG. 5 shows an example of a display setting screen.
Figure 6:
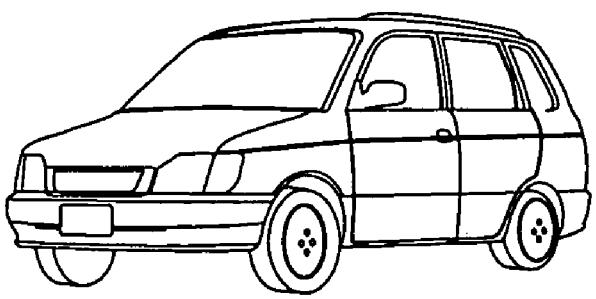
FIG. 6 shows a display example of a document based on a composite file.
Figure 7:
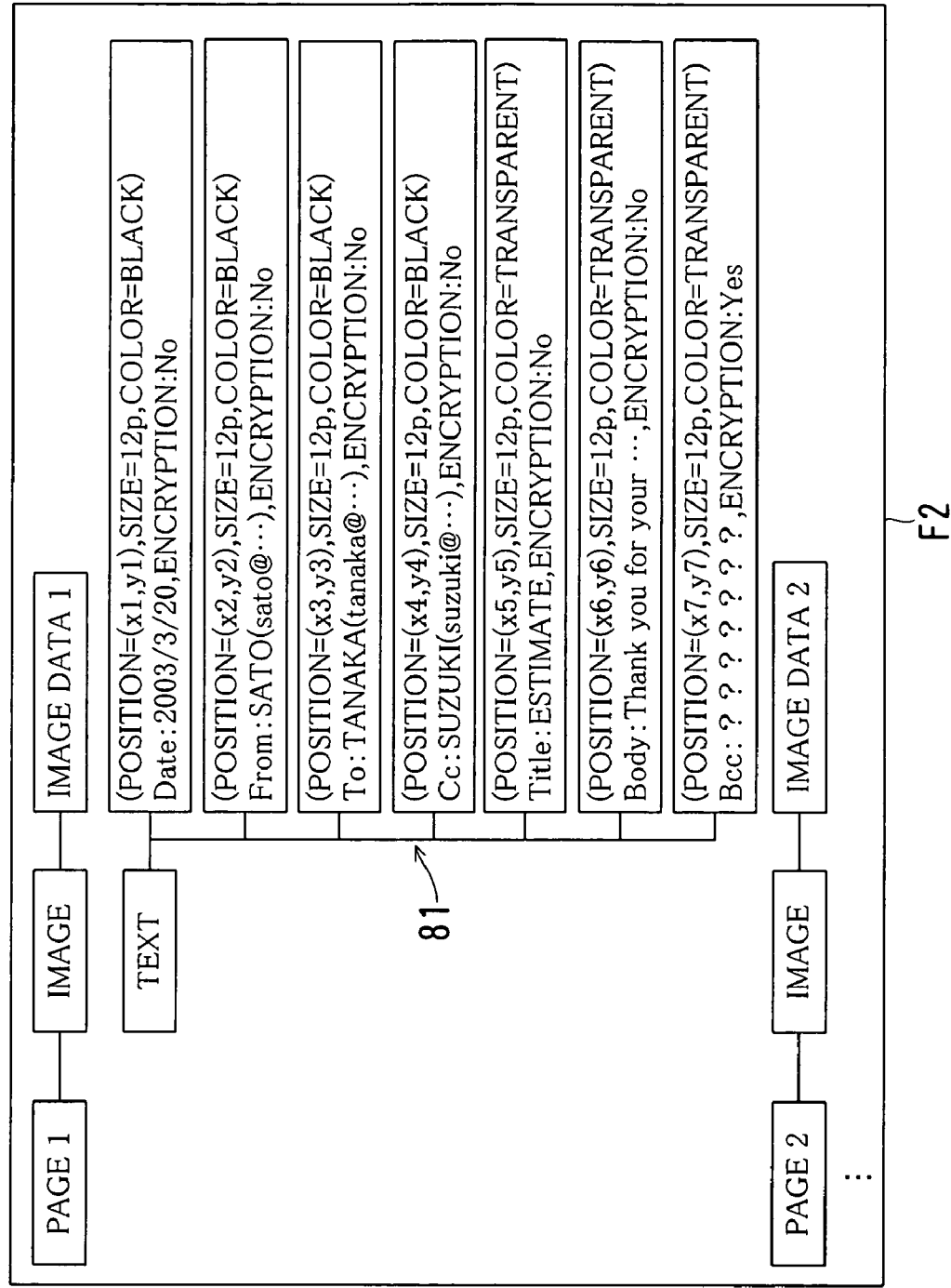
FIG. 7 is a diagram showing an example of a structure of a composite file.
Figure 8:
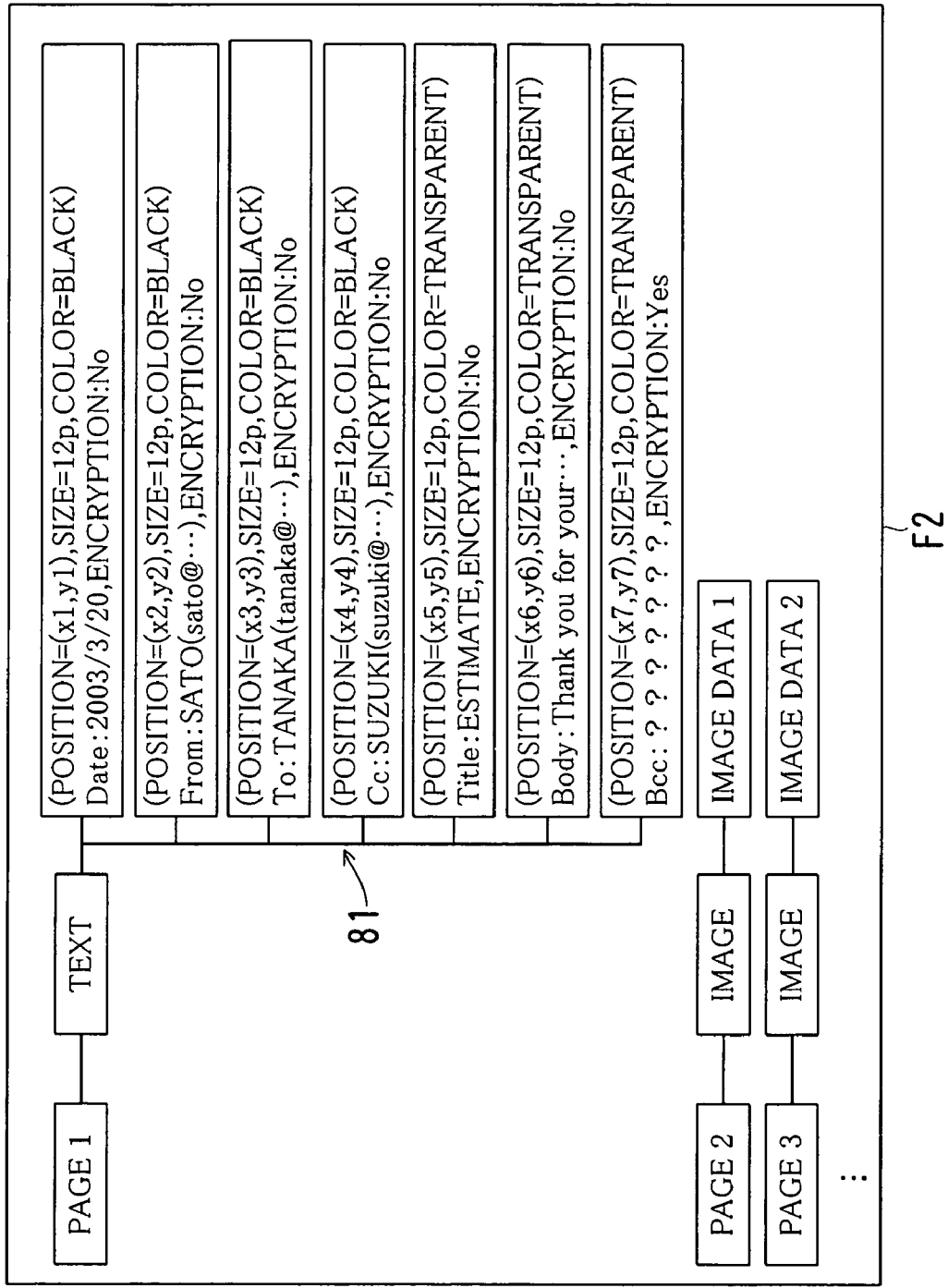
FIG. 8 shows a modification of the structure of the composite file.
Figure 10:
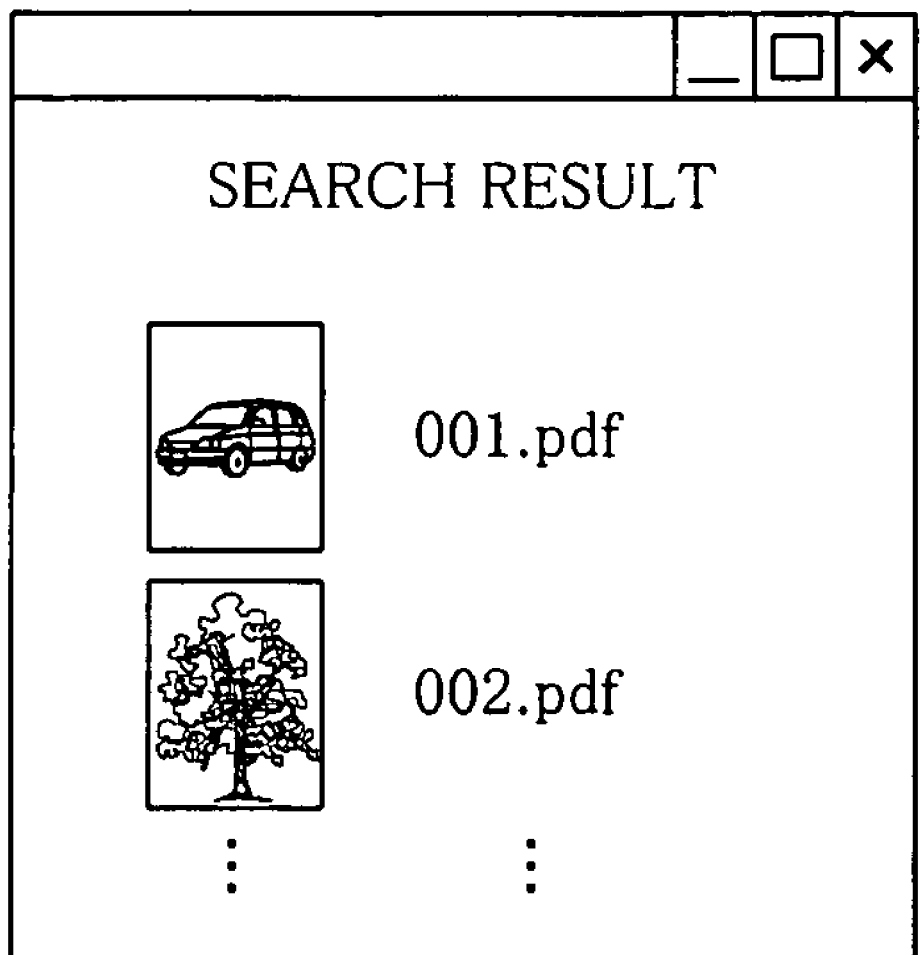
FIG. 10 shows an example of a search result screen.

FIG. 1 is a diagram showing an example of a general structure of an e-mail transmission and reception system 100, FIG. 2 is a diagram showing an example of a functional structure of a transmission terminal 2 and a reception terminal 3, FIG. 3 shows an example of an e-mail creation screen HG1, FIG. 4 is a table showing an example of set contents of transmission information 81, FIG. 5 shows an example of a display setting screen HG2, FIG. 6 shows a display example of a document based on a composite file F2, FIG. 7 is a diagram showing an example of a structure of the composite file F2, FIG. 8 shows a modification of the structure of the composite file F2, FIG. 9 shows an example of a file search screen HG3 and FIG. 10 shows an example of a search result screen HG4.

As shown in FIG. 1, the e-mail transmission and reception system 100 includes the transmission terminal 2, the reception terminal 3 and a communication line 4. The transmission terminal 2 can send an e-mail message to the reception terminal 3 via the communication line 4, a mail server or others.

As the communication line 4, for example, the Internet, an intranet, a public line, a dedicated line or the like is in use.

The transmission terminal 2 can send an e-mail message with an attachment to the reception terminal 3 via the communication line 4. As the transmission terminal 2 and the reception terminal 3, a mobile terminal such as a personal digital assistant (PDA), a personal computer, a workstation or the like is in use. An image input device 5 is connected to the transmission terminal 2. The image input device can be a scanner, a digital camera or other. Further, the transmission terminal 2 or the reception terminal 3 can be a multifunction peripheral (sometimes called an MFP) in which functions of a copier, a printer, a scanner, a facsimile machine, a document server or others are consolidated.

On a magnetic storage device of the transmission terminal 2 are installed programs and data for realizing functions of various portions including an image input portion 201, an image file storage portion 202, a transmission information setting portion 203, a display setting portion 204, a file combining portion 205, an e-mail message transmission portion 206 and an encryption processing portion 207, all of which are shown in FIG. 2.

On a magnetic storage device of the reception terminal 3 are installed programs and data for realizing functions of various portions including an e-mail message reception portion 301, a received file management portion 302, a file display portion 303, a file search portion 304 and a decryption processing portion 305, all of which are shown in FIG. 2.

These programs and data are loaded on a RAM in each of the terminals as required and the programs are executed by each CPU. Thus, a function of each of the portions shown in FIG. 2 is realized as described below.

The image input portion 201 inputs data of an image obtained by scanning a document or shooting from the image input device 5. The input image data are stored as an image file F1 in the image file storage portion 202. Alternatively, image data may be edited using application software such as image edit software or desktop publishing (DTP) software to be stored as an image file F1.

Hereinafter, an explanation is made to a case of an image file F1 created in PDF of Adobe Systems Incorporated, for example. This PDF enables a document including plural pages to be saved as one file. Accordingly, plural input images can be saved as one image file F1.

The transmission information setting portion 203 sets transmission information 81 that is necessary to attach an image file F1 to an e-mail message EM to send the same to the reception terminal 3. This setting can be performed in the following procedure.

A user of the transmission terminal 2 starts up e-mail software that is installed on the transmission terminal 2, so that the e-mail creation screen HG1 shown in FIG. 3 is displayed on a display device.

In a text box TX11 is entered a name or an e-mail address of a sender, i.e., the user of the transmission terminal 2. In a text box TX12 is entered an e-mail address or others of a recipient, i.e., a user at a destination of an image file F1. When the same image file F1 is intended to be sent to another user, an e-mail address or others of the user is entered in a text box TX13. As described later, the e-mail addresses entered in the text boxes TX12 and TX13 will be visible to all users who receive the e-mail message EM. When the sender wishes to keep an e-mail address of a destination private, the sender enters the e-mail address in a text box TX17.

In text boxes TX14 and TX15 are entered a title (subject) and a body of an e-mail message, respectively. In a text box TX16 is entered a path name or a file name of the image file F1 to be attached for designation.

Referring to FIG. 2 again, when an e-mail address is entered in the text box TX17, the encryption processing portion 207 encrypts the e-mail address to generate private data SDT. The encryption is performed by known methods. Hereinafter, a conventional encryption system in which a password is used as an encryption key is taken as an example for explanation.

Before generating the private data SDT, the encryption processing portion 207 requests the sender to enter a password for encryption. The encryption processing portion 207 uses the entered password as an encryption key to encrypt the e-mail address indicated in the text box TX17, so that the private data SDT are generated.

The transmission information setting portion 203 converts the items entered in the text boxes TX11-TX15 to text data. Further, the transmission information setting portion 203 converts a date and time when the e-mail message is created on the e-mail creation screen HG1 (hereinafter, simply referred to as a "date") to text data. Then, the transmission information setting portion 203 sets transmission information 81 as shown in FIG. 4 based on the contents that have been converted to text data and the private data SDT generated by the encryption processing portion 207. In this embodiment, although the contents entered in the text box TX16 (a path to the image file F1) are not included in the transmission information 81, the contents may be included therein. It can be changed appropriately or can be selected by the user which items are included in the transmission information 81.

The display setting portion 204 sets how to display the contents of the transmission information 81 together with an image relating to the image file F1 in the reception terminal 3 that is a destination. Such setting is performed in the following procedure.

After creating the e-mail message on the e-mail creation screen HG1 shown in FIG. 3, the user at the transmission terminal 2 clicks a display set button BN11. Then, the display setting screen HG2 showing layout samples (referred to as "template(s)" below) is displayed as shown in FIG. 5.

These templates show types of layouts for displaying the transmission information 81. The user selects a preferable template among the templates by selecting one option button in an option button group SB11. Further, the user selects on which page the transmission information 81 should be displayed by selecting one option button in an option button group SB12. The display setting portion 204 sets display information 82 based on the selected contents.

When a set button BN21 is clicked after the selection mentioned above, the display setting screen HG2 is closed and the e-mail creation screen HG1 shown in FIG. 3 is displayed again. When a send button BN12 is clicked, the file combining portion 205 in FIG. 2 inserts the transmission information 81 set by the transmission information setting portion 203 into the image file F1 based on the display information 82 set by the display setting portion 204. Thus, the file combining portion 205 generates a composite file F2 for displaying a document including an image (image object) and a text (text object) shown in FIG. 6. The composite file F2 is specifically generated by the following procedure.

It is supposed that the display information 82 is set as a "type B" and "overlaid on the first page for display", for example (see FIG. 5). In this case, a display position of each of a date (Date), a sender (From), a destination address (To), another destination address (Cc) and another destination address to be concealed (Bcc), i.e., coordinates thereof in a page, a font size and a font color that are used for display are determined in accordance with a layout shown in a template of the type B.

Referring to the example shown in FIG. 5, it does not appear that the type B includes a subject (Title) and a body. This does not mean that the composite file F2 is generated so as not to include information relating to the subject and the body. This means that the composite file F2 is generated so that the subject and the body are merely hidden.

In this embodiment, a font color of each of the subject and the body is "transparent" in order to hide the subject and the body with information concerning the subject and the body being included in the composite file F2. As font colors of information concerning items other than the subject and the body, various colors including white, black, gray, red, blue and green are in use. The same applies to a case where a "type C" is selected.

Then, as shown in FIG. 7, contents of each item included in the transmission information 81 are associated with the item name and information about the determined display position, font size and font color, then to be inserted after image data A on the first page. In this way, the composite file F2 into which the transmission information 81 is written is generated. In this regard, however, as to an item including "encryption: Yes" (here, another destination address to be concealed (Bcc)), "transparent" is used irrespective of the selected type.

In the example shown in FIG. 5, when "added as a front page for display" is selected instead of "overlaid on the first page for display", a new page is added as the first page, so that all original pages including the image file F1 are brought backward in increments of one page as shown in FIG. 8. Then, the transmission information 81 is written into the added page to generate a composite file F2. In short, the added page serves as a front page of image data to be transmitted.

Referring to FIG. 2 again, the e-mail message transmission portion 206 sends an e-mail message EM to destinations specified in the transmission information 81, i.e., the addresses of "To", "Cc" and "Bcc" that are entered in the text boxes TX12, TX13 and TX17, respectively.

The e-mail message transmission portion 206 sends an e-mail message EM to users of "To" and "Cc" in the following procedure. The e-mail address specified in "Bcc" is deleted from the transmission information 81 included in the composite file F2. Then, an e-mail message EM to which the composite file F2 is attached is sent to the users of "To" and "Cc". Further, the composite file F2 in which the e-mail address specified in "Bcc" is not deleted may be attached to an e-mail message EM so as to send the same. Since the e-mail address specified in "Bcc" is encrypted, the e-mail address cannot be known unless the users of "To" and "Cc" break the encryption by obtaining the encryption key or in other ways.

With respect to a user of "Bcc", the e-mail message transmission portion 206 sends an e-mail message EM to which the composite file F2 is attached without the deletion mentioned above. Additionally, the encryption key for the private data SDT (the encrypted e-mail address of "Bcc") included in the composite file F2 is also transmitted to the user of "Bcc". The encryption key is added to the e-mail message EM to which the composite file F2 is attached for transmission. Alternatively, the encryption key may be attached to an e-mail message other than the e-mail EM for transmission. On this occasion, however, the two e-mail messages are linked with each other or other ways are used, so that a relationship between the encryption key and the private data SDT is known in the reception terminal 3.

Thus, image data to be sent are completely transmitted to the reception terminal 3.

In the reception terminal 3, when the e-mail message reception portion 301 receives the e-mail message EM, the composite file F2 as an attachment is stored in the received file management portion 302. In this way, composite files F2 transmitted from each transmission terminal 2 accumulate in the received file management portion 302.

The received file management portion 302 uses a part of the magnetic storage device in the reception terminal 3 as a memory area for composite files F2. Alternatively, it is also possible to use a medium such as an MO, a CD-R, a DVD-R or a DVD-RAM. On this occasion, a hard disc drive corresponding to each of the media is connected to the reception terminal 3 beforehand.

The file search portion 304 performs processing for searching a composite file F2 that a user desires from composite files F2 accumulated in the received file management portion 302. The processing is performed in the following procedure.

A user operates the reception terminal 3 to display the file search screen HG3 shown in FIG. 9. Then, the user enters a keyword for a search, a date or others in a predetermined text box to click a search button BN31.

The file search portion 304 seeks a composite file F2 including transmission information 81 corresponding to the entered keyword or others in the received file management portion 302. Then, as shown in FIG. 10, file names and thumbnails (sample images) of the sought composite files F2 are displayed in the form of a list as the search result screen HG4. Here, a text object in which a transparent font is used becomes a search target.

However, when the item of "Bcc" is made a keyword, search processing is performed as follows. When a user who receives a composite file F2 receives an encryption key corresponding to private data SDT (see FIG. 4) included in the composite file F2, the decryption processing portion 305 uses the encryption key to decrypt the private data SDT and convert it to a plain text. Then, the plain text and the keyword are checked against each other for initiating a search. Before conducting the search, it is possible to make the user enter a password that is the encryption key. Concerning private data SDT (an e-mail address of "Bcc") whose corresponding encryption key is not received, the search processing is skipped. A structure in which a search is attempted regardless of whether an encryption key is received or not may be possible. However, it is natural that a search cannot be conducted successfully without an encryption key.

When a file name or a thumbnail within the search result screen HG4 is clicked, the file display portion 303 performs processing for displaying contents of a composite file F2 corresponding to the clicked file name or thumbnail. More particularly, the file display portion 303 starts up application software depending on file type of the composite file F2 (Acrobat Reader of Adobe Systems Incorporated, for example) to open the composite file F2, so that the contents of the composite file F2 are displayed.

The contents of "Bcc", however, are displayed only when the user receives an encryption key corresponding thereto from the transmission terminal 2 and colors other than transparent are designated as a font color (see FIGS. 7 and 8).

Figure 11:
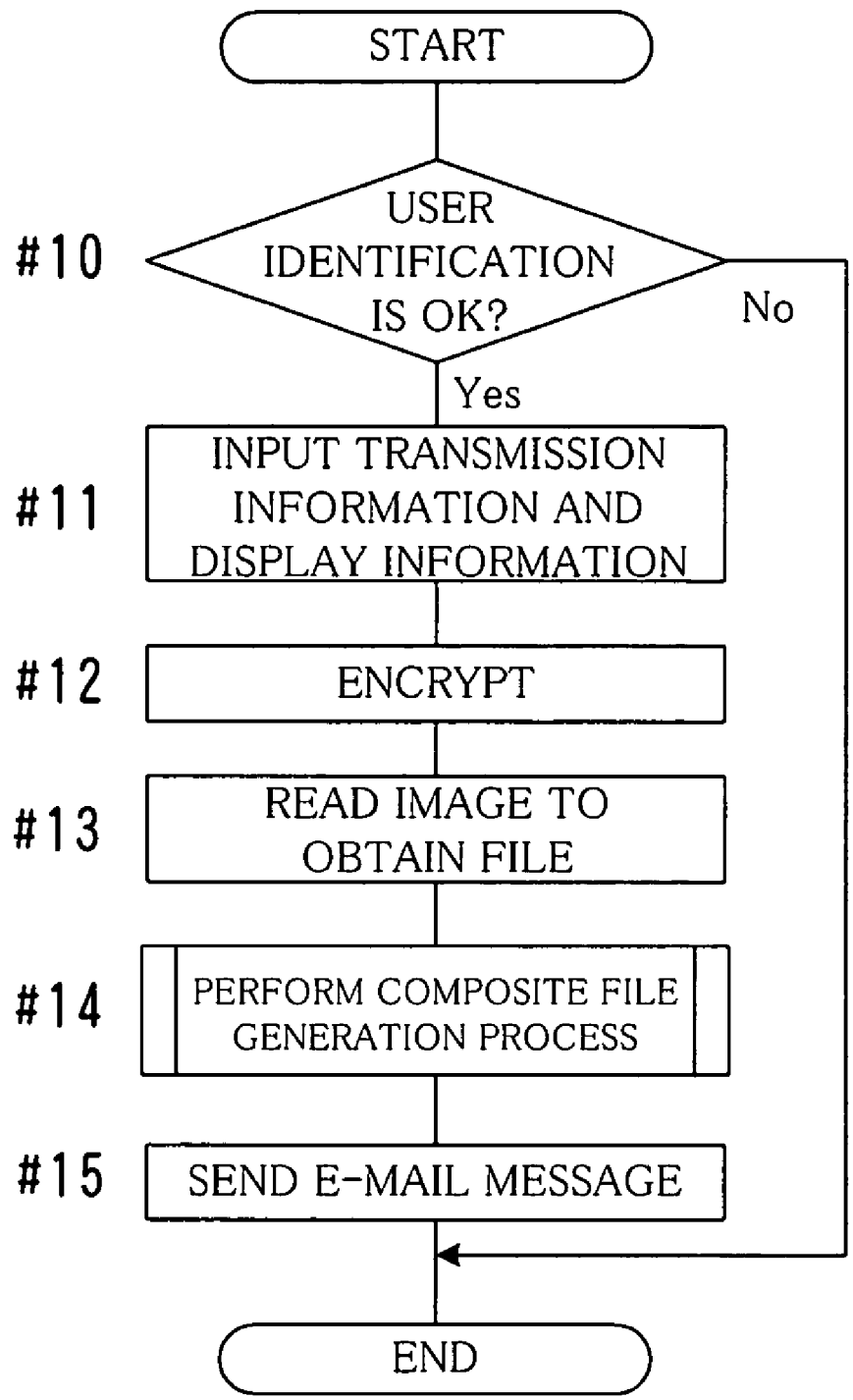
FIG. 11 is a flowchart explaining an example of a flow of a process in the transmission terminal at the time of transmitting an e-mail message.
Figure 12:
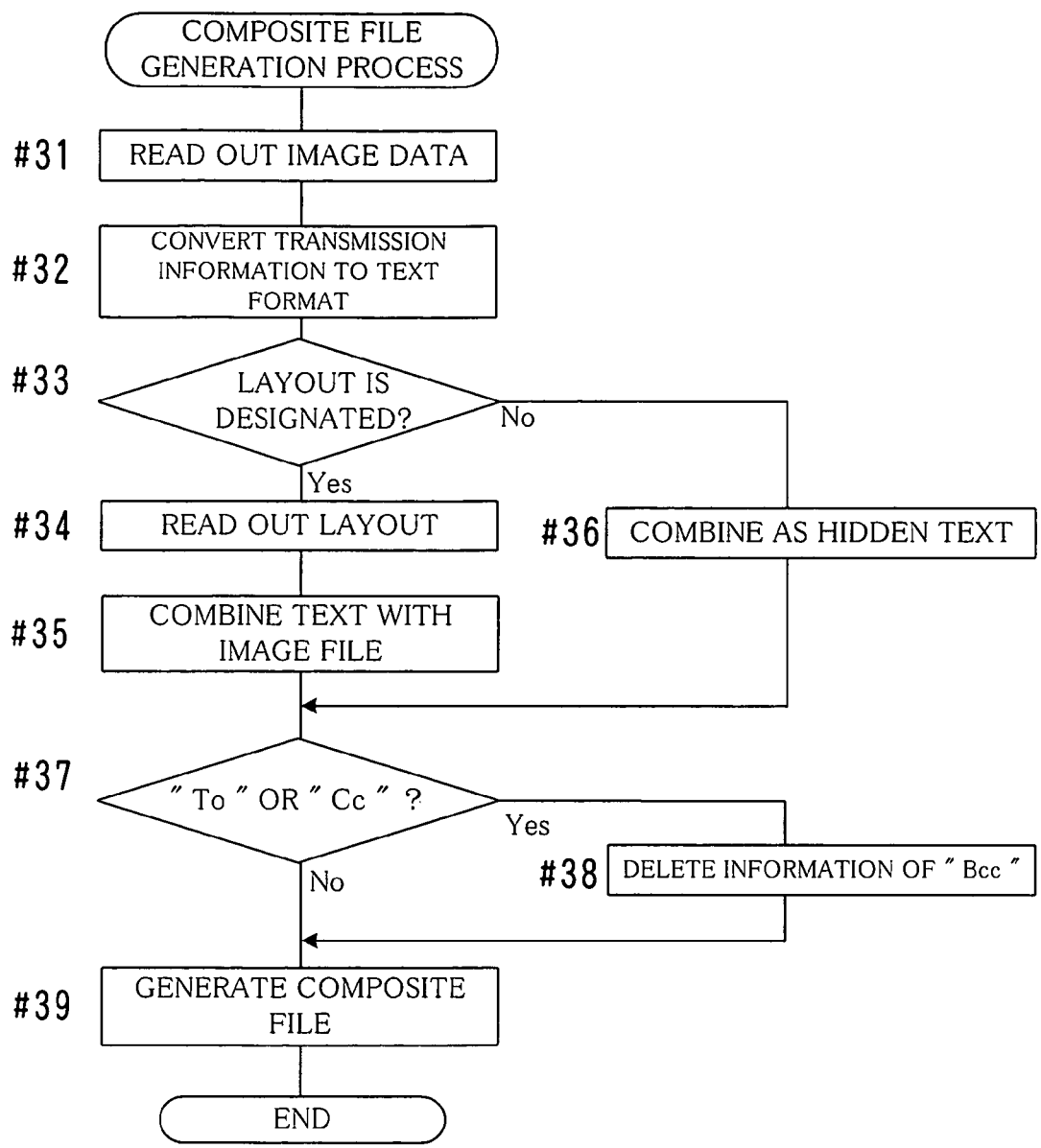
FIG. 12 is a flowchart explaining an example of a flow of a composite file generation process.

FIG. 11 is a flowchart explaining an example of a flow of a process in the transmission terminal 2 at the time of transmitting an e-mail message EM and FIG. 12 is a flowchart explaining an example of a flow of a composite file generation process.

Next, an explanation is made to a flow of a process when image data obtained by the image input device 5 are sent from the transmission terminal 2 to the reception terminal 3 with reference to the flowcharts.

First, a user enters his/her user ID and password to logon to the transmission terminal 2. Alternatively, the user may enter his/her user ID and password at the time of starting up e-mail software.

Then, the transmission terminal 2 performs user identification based on the entered user ID and password as shown in FIG. 11 (#10). When the correct user ID and password are not entered (No in #10), the user cannot send image data.

When the user is identified (Yes in #10), the user enters required items on the e-mail creation screen HG1 (see FIG. 3) to create an e-mail message EM. After that, the user selects a preferable template (a display type of transmission information) and a display method of transmission information using the display setting screen HG2 (see FIG. 5). Thus, the transmission terminal 2 obtains information for generating transmission information 81 (see FIG. 4) and display information 82 (#11).

The transmission terminal 2 encrypts an e-mail address indicated in "Bcc" of entered items to generate the transmission information 81 and the display information 82 (#12). Before or after the processing in step #12 or in parallel with the processing, an image to be sent together with the e-mail message EM is loaded to obtain an image file F1 (#13).

Processing of adding the transmission information 81 to the image file F1, i.e., processing of generating a composite file F2 is performed (#14). This processing is carried out by the procedure shown in the flowchart of FIG. 12.

Referring to FIG. 12, image data are read out from the image file F1 (#31), and the transmission information 81 is converted to a text format (#32). When a template for layout is designated, i.e., when the display information 82 is set (Yes in #33), the display information 82 is read out (#34) to combine the transmission information 81 with the image relating to the image file F1 in accordance with the display information 82 (#35). In this way, a composite file F2 having a file structure as shown in FIG. 7 or FIG. 8 is generated (#39).

When no template for layout is designated (No in #33), a font color used for displaying all items included in the transmission information 81 is set to transparent to combine the transmission information with the image relating to the image file F1 (#36). Thereby, a composite file F2 in which the transmission information 81 is set to non-display is generated (#39).

In the case of generating a composite file F2 to be sent to a user indicated in "To" or "Cc", it may be possible to delete information about an e-mail address specified in "Bcc" from the transmission information 81 (Yes in #37, and #38).

Referring to FIG. 11 again, the generated composite file F2 is transmitted to an e-mail address indicated in the transmission information 81 as an attachment to the e-mail message EM. When a destination is a user (an e-mail address) specified in "Bcc", an encryption key (password) that was used for encryption is also transmitted.

The reception terminal 3 receives the e-mail message EM to store the composite file F2 attached to the e-mail message EM in the received file management portion 302 (see FIG. 2). A user at the reception terminal 3 can browse and search the composite file F2 only when the user is identified by entering a correct user ID and password. Additionally, the user can browse and search an encrypted e-mail address specified in "Bcc" (private data SDT) only when the user receives an encryption key corresponding to the private data SDT.

In the present embodiment, a composite file F2 generated by adding transmission information 81 to an image file F1 is transmitted to a user at the other end as an attachment to an e-mail message EM. Thereby, the user at the other end (a recipient) can easily manage the received file (the composite file F2) without any regard for the relativity of the file to the e-mail message EM.

Even if many files accumulate in the received file management portion 302, for example, a desired file can be easily searched without e-mail software. In addition, even if a file is copied or transferred to another directory or another storage medium, added transmission information 81 can be referred to, ensuring that attribute such as the transmission source of the file can be recognized easily.

Since an item name is added to each item included in transmission information 81, it is possible to know what each piece of information added to a received file means easily. Additionally, a file search is possible by designating an item.

A transparent font is used with respect to an item that is not intended to be displayed of all items included in transmission information 81. This enables such an item to be a target of search with being hidden.

Information that a user does not wish to disclose to other users is encrypted for transmission, the information including an e-mail address specified in "Bcc". Accordingly, it is possible to improve security compared to conventional methods.

In the present embodiment, only information specified in "Bcc" (an e-mail address) of items included in transmission information 81 is encrypted for transmission. However, information specified in other items may be encrypted for transmission. For example, it is possible that an encryption setting screen HG6 (see FIG. 15), which is described later, is displayed and a sender designates which item information is encrypted.

It is also possible to prepare Two "Bcc". On the e-mail creation screen HG1 (see FIG. 3), for example, a "first Bcc" and a "second Bcc" are prepared so that two destination addresses can be specified. The specified destinations (e-mail addresses) are encrypted using an encryption key designated by a sender. Then, the encryption key is sent to the destination designated as the "first Bcc", while no encryption key is sent to the destination designated as the "second Bcc". Stated differently, only a user at the destination designated as the "first Bcc" can know an e-mail address specified in the "first Bcc" and an e-mail address specified in the "second Bcc".

Second Embodiment

Figure 13:
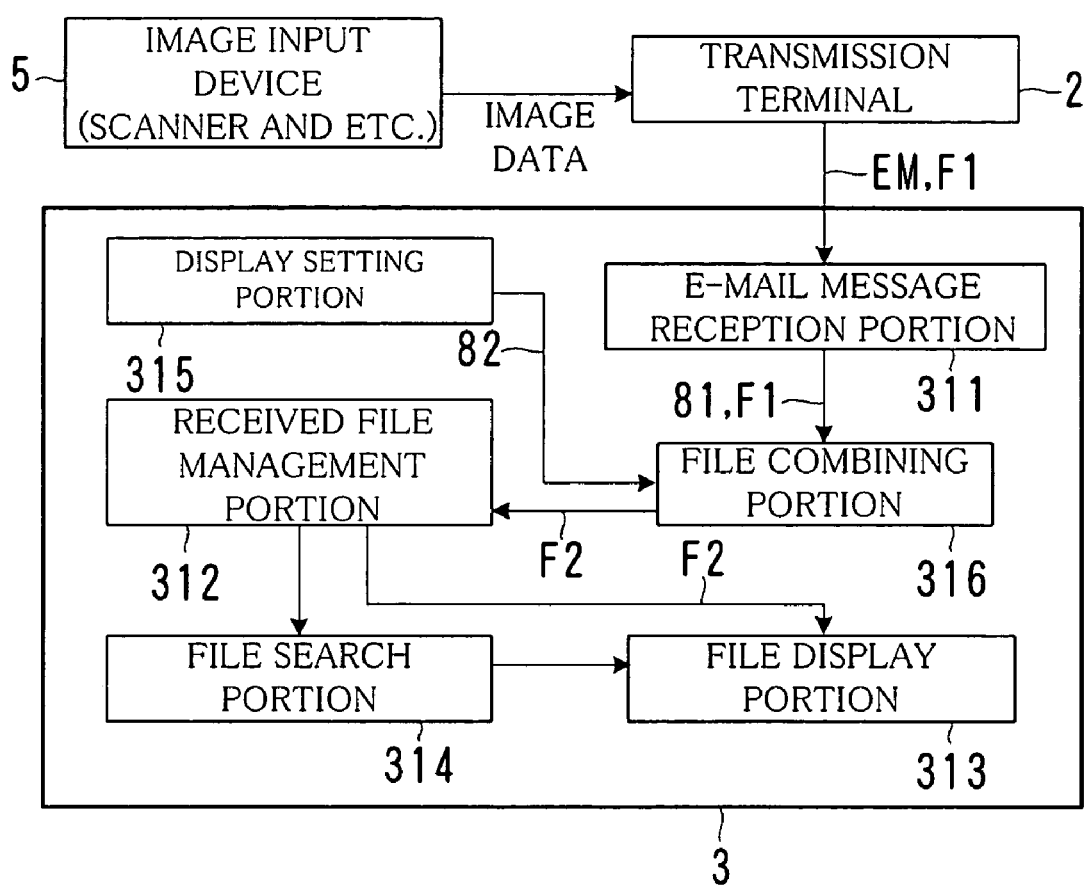
FIG. 13 is diagram showing an example of a functional structure of a reception terminal in a second embodiment.
Figure 14:
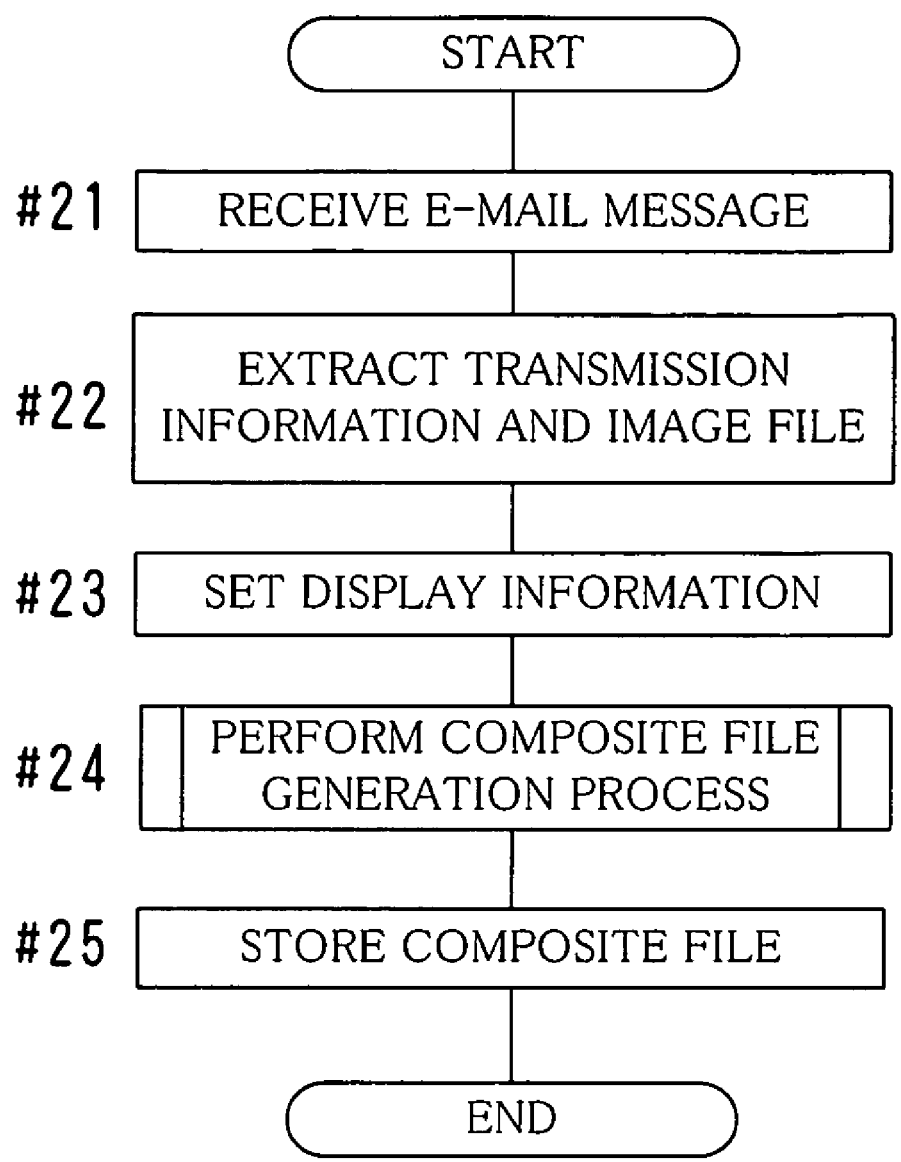
FIG. 14 is a flowchart explaining an example of a flow of a process in the reception terminal after receiving an e-mail message in the second embodiment.

FIG. 13 is diagram showing an example of a functional structure of a reception terminal 3 in a second embodiment and FIG. 14 is a flowchart explaining an example of a flow of a process in the reception terminal 3 after receiving an e-mail message EM in the second embodiment.

In the first embodiment, a composite file F2 is generated in the transmission terminal 2. On the contrary, in the second embodiment, a composite file F2 is generated in the reception terminal 3. A general structure of an e-mail transmission and reception system 100 in the second embodiment is the same as the case of the first embodiment (see FIG. 1).

On a magnetic storage device of the reception terminal 3 according to the second embodiment are installed programs and data for realizing functions of various portions including an e-mail message reception portion 311, a received file management portion 312, a file display portion 313, a file search portion 314, a display setting portion 315 and a file combining portion 316, all of which are shown in FIG. 13.

It is sufficient that a transmission terminal 2 has a function of attaching an image file F1 to an e-mail message EM to send the e-mail message EM. It is not always necessary that the transmission terminal 2 have a function for generating a composite file F2 (the file combining portion 205 in FIG. 2).

A user at the transmission terminal 2 starts up e-mail software to enter a sender (From), a destination address (To), another destination address (Cc), a subject (Title), a body and others for creation of an e-mail message EM. Further, the user designates an image file F1 to be attached to the e-mail message EM. Then, the user transmits the e-mail message EM to the reception terminal 3.

After receiving the e-mail message EM sent from the transmission terminal 2, the e-mail message reception portion 311 in the reception terminal 3 extracts the image file F1 attached to the e-mail message EM. In addition, the e-mail message reception portion 311 extracts information relating to a sender of the e-mail message EM and others as transmission information 81 (see FIG. 4). However, transmission information 81 of an e-mail message EM that a user specified in "To" or "Cc" receives does not include an item of "Bcc". Although transmission information 81 of an e-mail message EM that a user specified in "Bcc" receives includes an item of "Bcc", the item is not encrypted.

The display setting portion 315 performs the same processing as the display setting portion 204 (see FIG. 2) in the first embodiment. More particularly, a window similar to the display setting screen HG2 shown in FIG. 5 is displayed on a display device in the reception terminal 3. Then, the display setting portion 315 makes a user select layout or others, setting how to display contents of transmission information 81 together with an image of an image file F1.

The file combining portion 316 performs the same processing as the file combining portion 205 (see FIG. 2) in the first embodiment. More specifically, the file combining portion 316 inserts extracted transmission information 81 into an image file F1 based on display information 82 set by the display setting portion 315, so that a composite file F2 is generated. The generated composite file F2 is stored in the received file management portion 312.

Similarly to the file display portion 303 and the file search portion 304 in the first embodiment, the file display portion 313 and the file search portion 314 perform processing for displaying contents of a composite file F2 and processing for searching a composite file F2, respectively.

Next, a flow of a process of generating a composite file F2 in the reception terminal 3 is described with reference to the flowchart shown in FIG. 14. After receiving an e-mail message EM (#21), the reception terminal 3 extracts an image file F1 as an attachment and transmission information 81 of the e-mail message EM (#22).

A user selects a preferable template (display type of transmission information) and a display method of transmission information on the display setting screen HG2 (see FIG. 5). The transmission terminal 2 sets display information 82 based on the selected contents (#23).

The reception terminal 3 generates a composite file F2 based on the extracted image file F1, the extracted transmission information 81 and the set display information 82 (#24). The procedure for generating the composite file F2 is almost the same as that of the flowchart shown in FIG. 12. However, the steps #37 and #38 in FIG. 12 are not performed. Then, the generated composite file F2 is stored in the received file management portion 312 (see FIG. 2)(#25).

According to this embodiment, similarly to the first embodiment, a composite file F2 can be easily managed without any regard for the relativity of the file to the e-mail message EM. Particularly, this embodiment is useful for a user who receives e-mail messages EM with an attachment from unspecified users.

Figure 15:
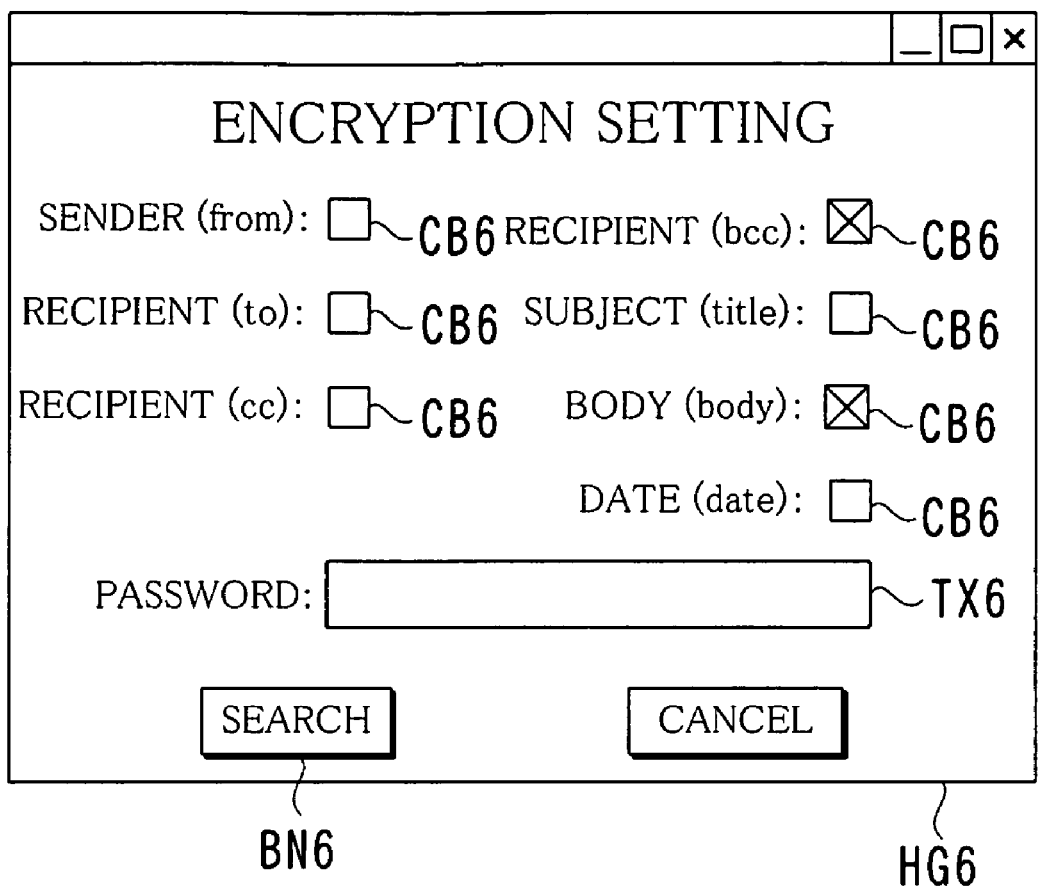
FIG. 15 shows an example of an encryption setting screen.

FIG. 15 shows an example of an encryption setting screen HG6. It is possible to encrypt information that is undesirable to be disclosed to others, such as confidential information between a sender and a recipient, of transmission information 81 for management. On this occasion, for example, the reception terminal 3 may be constituted as follows.

The display setting portion 315 shown in FIG. 13 displays the encryption setting screen HG6 as illustrated in FIG. 15. A user at the reception terminal 3 clicks a checkbox CB6 corresponding to an item to be encrypted of items included in transmission information 81 of received e-mail message EM to check a box and enters a password as an encryption key in a text box TX6 for setting. Then, the user clicks a set button BN6.

The file combining portion 316 encrypts only information of an item whose checkbox CB6 is checked of items included in the transmission information 81 by using the set encryption key (password). After that, the file combining portion 316 inserts this transmission information 81 into an image file F1 thereby to generate a composite file F2.

The file display portion 313 displays encrypted information only when a user who logons to the reception terminal 3 is identical to a user who has set an encryption key of the information or when a user has an encryption key of the information (i.e., knows a password). Similarly, the file search portion 314 covers encrypted information as a search target only in any one of the cases mentioned above.

Under the constitution mentioned above, a recipient operates the encryption setting screen HG6, which facilitates encryption of information to be kept private among transmission information 81 of a received composite file F2. Thus, leakage of confidential information can be prevented even if a received composite file F2 is inadvertently transferred to others or even if others access to a composite file F2 in a unauthorized manner.

Figure 17:
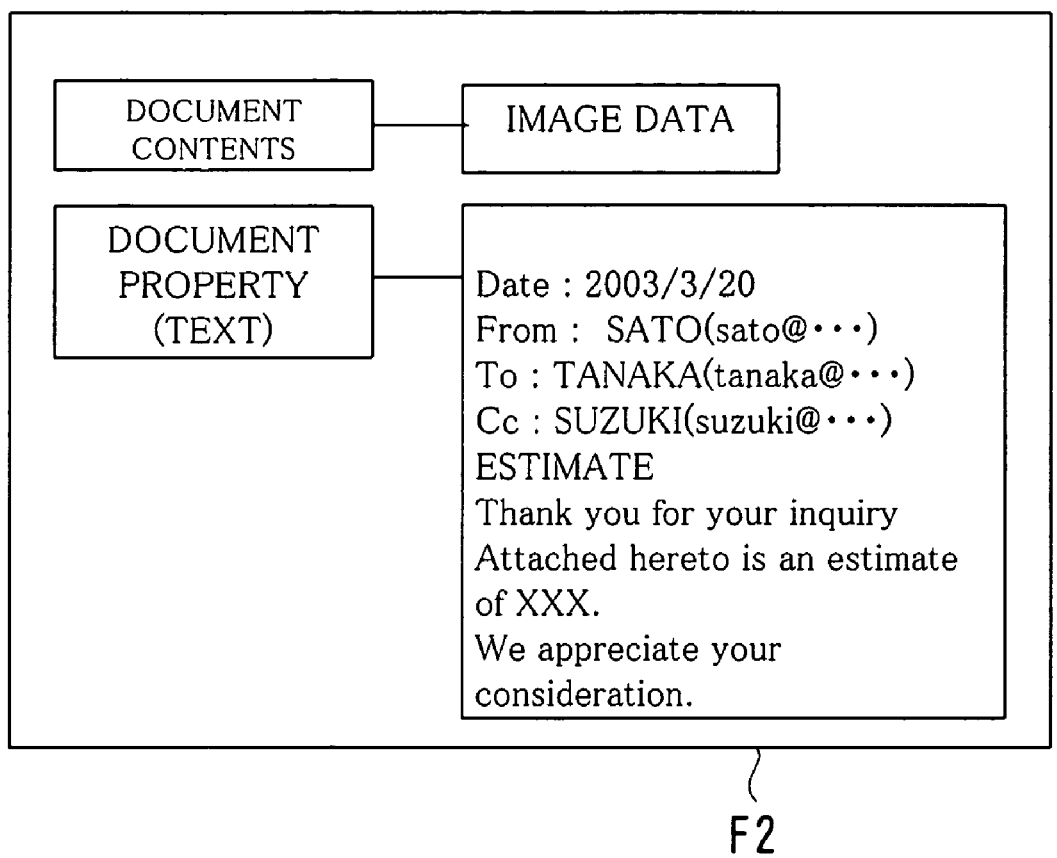
FIG. 17 shows a modification of the file structure of the composite file.

FIG. 16 shows an example of a display setting screen HG5 and FIG. 17 shows a modification of the file structure of the composite file F2.

In the first and second embodiments, the transmission information 81 shown in FIG. 4 is added to generate a composite file F2. However, information other than the information shown in FIG. 4 may be added as transmission information 81. For instance, server addresses through which an e-mail message EM passes until being reached the reception terminal 3 may be added.

A composite file F2 may be transmitted (transferred) to the reception terminal 3 based on communication protocol such as File Transfer Protocol (FTP), Server Message Block (SMB) or the like. In this case, it is sufficient that network addresses of a transmission source (a transference source) and a destination are added as transmission information 81.

As the transmission terminal 2 or the reception terminal 3 shown in FIG. 1, it is possible to use a terminal including both a function of the transmission terminal 2 (see FIG. 2) in the first embodiment and a function of the reception terminal 3 (see FIG. 13) in the second embodiment. The use of such a terminal enables file exchange without caring a function of a terminal at the other end.

Although the three templates shown in FIG. 5 are prepared in order to set display information 82, other templates may be prepared. Further, a structure is possible in which the display setting screen HG5 shown in FIG. 16 is prepared and display or non-display (non-display using a transparent font) of each item included in transmission information 81 is set. On this occasion, the e-mail transmission and reception system 100 may be so structured that a display position of text or a font color or a font size used for display are set. A structure is possible in which a highlight including boldface or a underscore can be set.

The e-mail transmission and reception system 100 may be structured so that contents of a composite file F2 can be displayed based on desired conditions of a user who intends to use the composite file F2 irrespective of preset display conditions of transmission information 81 (see FIG. 7 or FIG. 8). For example, a window similar to the display setting screen HG5 shown in FIG. 16 is displayed on the reception terminal 3 before opening the composite file F2 and changes of the display conditions are accepted for each item included in the transmission information 81. Then, the composite file F2 is opened based on the changed display conditions to display the contents.

The first and second embodiments can apply to a file other than the PDF, for example, a file created by presentation software or spreadsheet. In the case of a spreadsheet format, for example, transmission information 81 is inserted into the first page (sometimes referred to as "sheet" in the spreadsheet) as a text object. Alternatively, a page (sheet) is newly added and the transmission information 81 is written into a predetermined cell on the added page.

When a format where a text object and an image object can not be overlapped with each other, such as TIFF, is used as an image file F1, transmission information 81 may be added to the image file F1 as attribute information of the file (e.g., "property" in Windows©). In this case, an e-mail address specified in "Bcc" is not added. Also in the case of a format where no image object is included, such as an audio file, it is sufficient that transmission information 81 is added as attribute information of the file.

In the first and second embodiments, the explanation is made to the case in which the conventional encryption system is used to encrypt information. However, a public key cryptosystem can be used to encrypt information. In this case, a recipient, i.e., a user at the reception terminal 3 prepares a pair of a private key and a public key and only the public key is distributed to other users beforehand. When transmitting an e-mail message EM and a composite file F2 to the reception terminal 3, the transmission terminal 2 encrypts information using the public key. Then, a recipient who has received the encrypted information decrypts the information using the private key. As an algorithm for the encryption, an RSA, an elliptic curve cryptosystem or the like is used.

Structures, processing contents, processing order and timing for performing processing of each part or whole part of the e-mail transmission and reception system 100, the transmission terminal 2 and the reception terminal 3, contents of the transmission information 81, window structures, encryption means and others can be varied as required within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A data communication device comprising:
a file memory portion for storing a first file;
a transmission information setting portion for setting transmission information for sending a message that is intended to include the first file as an attachment to a recipient;
a file generation portion for generating a second file by adding the transmission information to the first file;
a transmission portion for sending a message that includes the generated second file as an attachment to the recipient, and
a display setting portion for setting whether or not the transmission information is displayed,
wherein
the file generation portion generates the second file by setting a font used for displaying the transmission information to transparent when the display setting portion sets that the transmission information is not displayed.

2. A data communication device comprising:
a file generation portion for generating a second file by adding transmission information intended for sending a first file as an attachment of a message to a recipient;
a file storage portion for storing the generated second file in a storage medium, and
a display setting portion for setting whether or not the transmission information is displayed,
wherein
the file generation portion generates the second file by setting a font used for displaying the transmission information to transparent when the display setting portion sets that the transmission information is not displayed.

* * * * *